(12) United States Patent
Chang et al.

(10) Patent No.: US 11,121,394 B1
(45) Date of Patent: Sep. 14, 2021

(54) RECHARGEABLE BUTTON CELL

(71) Applicant: FUJIAN NANPING YANPING DISTRICT NANFU NEW ENERGY TECHNOLOGY CO., LTD., Fujian (CN)

(72) Inventors: Haitao Chang, Fujian (CN); Zhiming Zhang, Fujian (CN); Sheng Su, Fujian (CN)

(73) Assignee: Fujian Nanping Yanping District Nanfu New Energy Technology Co., Ltd, Fujian (CN)

( * ) Notice: Subject to any disclaimer, the term of this patent is extended or adjusted under 35 U.S.C. 154(b) by 0 days.

(21) Appl. No.: 16/910,387

(22) Filed: Jun. 24, 2020

(30) Foreign Application Priority Data

Apr. 17, 2020 (CN) .......................... 202010306784.6

(51) Int. Cl.
| | |
|---|---|
| *H01M 10/04* | (2006.01) |
| *H01M 50/109* | (2021.01) |
| *H01M 50/169* | (2021.01) |
| *H01M 50/172* | (2021.01) |

(52) U.S. Cl.
CPC ..... *H01M 10/0427* (2013.01); *H01M 50/109* (2021.01); *H01M 50/169* (2021.01); *H01M 50/172* (2021.01)

(58) Field of Classification Search
CPC ........... H01M 10/0427; H01M 50/109; H01M 50/172; H01M 50/169
See application file for complete search history.

(56) References Cited

U.S. PATENT DOCUMENTS

| | | | | |
|---|---|---|---|---|
| 2004/0048151 A1* | 3/2004 | Hayashi | ............ | H01M 10/0431 429/162 |
| 2005/0064268 A1* | 3/2005 | Cho | ...................... | H01M 8/247 429/470 |
| 2007/0020518 A1* | 1/2007 | Bito | .................... | H01M 50/578 429/181 |
| 2008/0026286 A1* | 1/2008 | Cui | ...................... | H01M 50/182 429/161 |
| 2012/0268073 A1* | 10/2012 | Morioka | ................. | H01M 4/70 320/128 |
| 2014/0315061 A1* | 10/2014 | Wang | ................ | H01M 10/0587 429/94 |

FOREIGN PATENT DOCUMENTS

| | | |
|---|---|---|
| CN | 102318122 A | 1/2012 |
| CN | 110600783 A | 12/2019 |
| JP | 62-88367 U | 6/1987 |

* cited by examiner

*Primary Examiner* — Jimmy Vo
(74) *Attorney, Agent, or Firm* — Locke Lord LLP; Tim Tingkang Xia, Esq.

(57) ABSTRACT

The present invention discloses a rechargeable button cell, which includes an anode shell, a cathode shell and a coiled electric core. The anode shell and the cathode shell define a receiving cavity in which the coiled electric core is located. A channel that extends in an axial direction of the rechargeable button cell is provided in the middle of the coiled electric core. An electrically conductive bar that extends on the cathode shell is located in the channel. An anode tab and a cathode tab of the coiled electric core are provided on the same side, which facilitates monitoring the conditions of the two tabs at the same time during the production and preventing the tabs from being damaged, thereby achieving good weldability and improving the assembling efficiency.

7 Claims, 2 Drawing Sheets

RECHARGEABLE BUTTON CELL

CROSS-REFERENCE TO RELATED PATENT APPLICATION

This application claims priority to Chinese Patent Application No. CN202010306784.6 filed in China on Apr. 17, 2020. The disclosure of the above application is incorporated herein in its entirety by reference.

FIELD

The present invention relates to the technical field of cells, and more particularly, to a rechargeable button cell.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

With the increasing miniaturization of electrical appliances and electronic products (such as Bluetooth headsets, hearing aids, and electronic watches), the market's demands for small-sized lithium-ion batteries with high energy density are increasing. A miniature rechargeable button cell can meet the above market demands owing to the characteristics of wide usage temperature, reusability, long storage time, stable discharge voltage, etc. In addition, with the development of 5G technology and the popularization of wearable devices and Internet of Things (TOT) applications, it is foreseeable that miniature rechargeable button cells will have broader prospects in the future.

However, at present, when such cells are produced, an anode tab and an anode tab of the cell are provided at both ends respectively. For example, the anode tab and an anode shell are welded on one side, and the cathode tab and a cathode shell are welded on the other side. Due to the limitation of a welding space, such production form is very difficult in welding, complicated in cell assembly process, low in assembly efficiency, and easy to cause damages to the tab placed on one side of a workbench.

Therefore, there is a need for a rechargeable button cell to at least partially solve the above-mentioned problems.

SUMMARY

To solve said problems, the present invention provides a rechargeable button cell.

The rechargeable button cell provided by the present invention comprises:

an anode shell which is provided with a top opening, wherein an insulation layer is provided on the bottom of the anode shell;

a cathode shell which is provided with a bottom opening, wherein an electrically conductive bar that protrudes downward is provided on the top of the cathode shell, and the anode shell and the cathode shell define a receiving cavity; and a coiled electric core which is located in the receiving cavity, wherein a channel that extends in an axial direction of the rechargeable button cell is provided in the middle of the coiled electric core, and the electrically conductive bar is located in the channel, wherein an anode tab and a cathode tab of the coiled electric core are provided on the same side, and the cathode tab is located above the insulation layer and electrically connected to the electrically conductive bar to realize the electrical connection between the cathode tab and the cathode shell.

According to the rechargeable button cell provided by the present invention, the anode tab and the cathode tab are provided on the same side, which facilitates monitoring the conditions of the two tabs at the same time during the production. In addition, one side where no tab is provided may be placed on a workbench to prevent the tab from being damaged, thereby achieving good weldability, simple assembly and high efficiency.

The coiled electric core further comprises an anode tab, wherein the anode tab is electrically connected to the anode shell, the anode tab and the cathode tab are provided adjacent to the anode shell.

The anode shell comprises an anode shell bottom, and an anode shell wall that extends upward from the circumferential edge of the anode shell bottom; the cathode shell comprises a cathode shell top, and a cathode shell wall that extends downward from the circumferential edge of the cathode shell top, the cathode shell wall being located inside the anode shell wall.

Preferably, the rechargeable button cell further comprises a sealing ring which comprises a sealing portion located between the anode shell wall and the cathode shell wall, and a bending portion that is bent inward around the bottom end of the cathode shell wall.

Preferably, the anode tab is at least partially provided between the anode shell wall and the sealing portion.

Preferably, the anode side wall is provided with a recess that is recessed inward in a radial direction of the rechargeable button cell, and the anode tab abuts against the recess.

Preferably, the rechargeable button cell further comprises a binding wire which is wound to the recess from the outside of the rechargeable button cell.

Preferably, the bottom of the electrically conductive rod is configured into a truncated cone shape.

Preferably, the electrically conductive bar is welded to the cathode shell.

Preferably, the cathode tab is connected to the electrically conductive bar by welding.

BRIEF DESCRIPTION OF THE DRAWINGS

The following accompanying drawings of the present invention are used here as part of the present invention to understand the present invention. Embodiments of the present invention and their descriptions are shown in the accompanying drawings to explain the principles of the present invention. In the accompanying drawings.

DETAILED DESCRIPTION

In the following description, a large number of specific details are given in order to provide a more thorough understanding of the present invention. However, it is apparent to those skilled in the art that the present invention can be implemented without one or more of these details. In other instances, some of the technical features well known in the art are not described in order to avoid the confusion with the present invention.

Exemplary embodiments according to the present invention are described in more detail below with reference to the accompanying drawings. However, these exemplary embodiments can be implemented in many different forms and should not be interpreted as being limited to the embodiments set forth herein. It should be understood that these embodiments are provided to make the disclosure of the present invention thorough and complete, and to fully convey the ideas of these exemplary embodiments to those of ordinary skill in the art.

Figure 1:
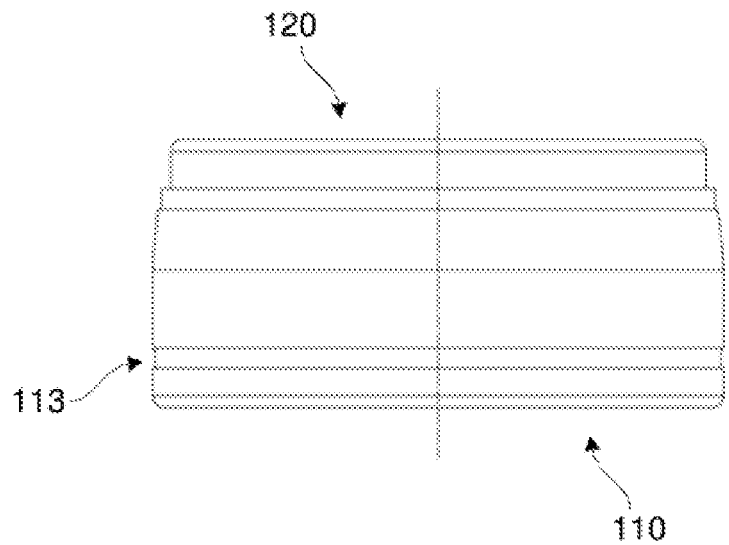
FIG. 1 is a schematic front view of a rechargeable button cell according to a preferred embodiment of the present invention.
Figure 2:
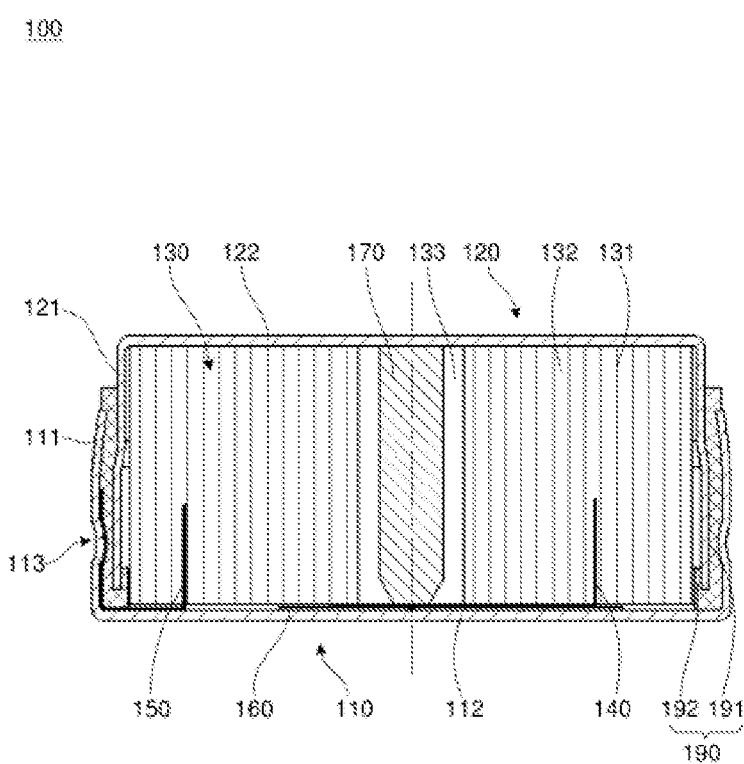
FIG. 2 is a schematic sectional view of the rechargeable button cell according to the preferred embodiment of the present invention.
Figure 3:
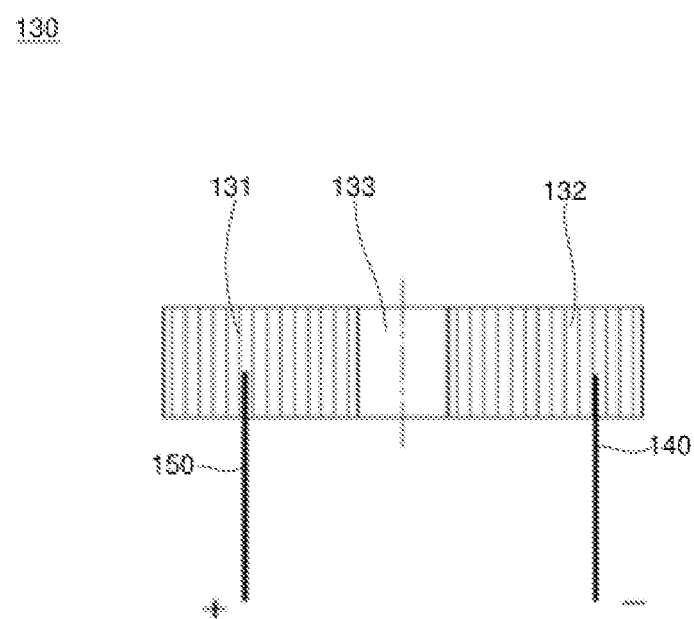
FIG. 3 is a schematic structural diagram of a coiled electric core of the rechargeable button cell according to the preferred embodiment of the present invention.

Referring to FIG. 1, FIG. 2 and FIG. 3, in a preferred embodiment of the present invention, a rechargeable button cell 100 comprises an anode shell 110, a cathode shell 120 and a coiled electric core 130. The anode shell 110 and the cathode shell 120 are preferably made of a metal material, for example, a stainless steel material of a model of 304 or 316L.

Specifically, referring to FIG. 2, the anode shell 110 comprises an anode shell bottom 112, and an anode shell wall 111 that extends upward from the circumferential edge of the anode shell bottom, and the anode shell wall 111 defines a top opening. An insulation layer 160 is provided on the bottom of the anode shell 110 and may be arranged on the anode shell bottom 112 in advance.

The cathode shell 120 comprises a cathode shell top 122, and a cathode shell wall 121 that extends downward from the circumferential edge of the cathode shell top 122, wherein the cathode shell wall 121 is located inside the anode shell wall 111, and the cathode shell wall 121 defines a bottom opening. An electrically conductive bar 170 that protrudes towards the bottom opening is provided on the top of the cathode shell 120, i.e., on the cathode shell top 122. The electrically conductive bar 170 extends in a direction of the anode shell 110. The electrically conductive rod 170 may be connected to the cathode shell 120 by welding or may be integrally formed with the cathode shell 120.

The cathode shell 120 is inserted via the bottom opening toward the top opening of the anode shell 110, and the anode shell 110 and the cathode shell 120 define a receiving cavity. The coiled electric core 130 and an electrolyte are provided in the receiving cavity.

Please refer to FIGS. 2 and 3 for the structure of the coiled electric core 130. The coiled electric core 130 comprises an anode piece 131, a cathode piece 132, and diaphragms that separates the anode piece 131 from the cathode piece 132. The anode piece 131, the cathode piece 132 and the diaphragms can be wound into an approximately cylindrical body, in a sequence from inside to outside: the diaphragm, the cathode piece 132, the diaphragm, the anode piece 131, the diaphragm, and so on. It is easy to understand that the positions of the anode piece 132 and the cathode piece 131 may be reversed. The anode piece 131 and the cathode piece 132 are coated with an anode active material and a cathode active material, respectively. In order to obtain higher energy density, a lithium cobalt oxide material is preferably used as the anode active material.

The coiled electric core 130 further comprises a cathode tab 140 and an anode tab 150. The cathode tab 140 and the anode tab 150 respectively extend toward the same side from the cathode tab 132 and the anode tab 131 in an axial direction of the rechargeable button cell 100. Preferably, the cathode tab 140 and the anode tab 150 extend toward the anode shell 110 and are disposed adjacently to the anode shell 110.

A channel 133 that extends in the axial direction of the rechargeable button cell 100 is provided in the middle of the coiled electric core 130, and an electrically conductive bar 170 is located in the channel 133. The anode tab 150 is electrically connected to the anode shell 110. The cathode tab 140 is electrically connected to the electrically conductive bar 170, such that the cathode tab 140 can be electrically connected to the cathode shell 120 via the electrically conductive bar 170. The middle part and the upper part of the electrically conductive bar 170 may be configured into a cylindrical shape respectively, and the bottom of the electrically conductive bar may be configured into a truncated cone shape. The electrically conductive bar 170 may be in welding connection or contact connection to the cathode tab 140.

According to the rechargeable button cell 100 provided by the present invention, the anode tab 150 and the cathode tab 140 are provided on the same side, which facilitates monitoring the conditions of the two tabs at the same time during the production. One side where no tab is provided may be placed on a workbench in operation to prevent the tab from being damaged, thereby achieving good weldability, simple assembly and high efficiency.

Referring to FIG. 2 below, in order to prevent electrolyte leakage and other conditions, the rechargeable button cell 100 further comprises a sealing ring 190 for sealing a gap between the anode shell wall 111 and the cathode shell wall 121. The sealing ring 190 comprises a sealing portion 191 located between the anode shell wall 111 and the cathode shell wall 121, and a bending portion 192 that is bent inward around the bottom end of the cathode shell wall 121. That is, the sealing ring 190 extends inward from the bottom of the cathode shell wall 121 in the radial direction of the rechargeable button cell 100 and is bent upward to the radial inner side of the cathode shell wall 121. The sealing ring 190 is preferably made of a plastic material, such as modified polypropylene. The sealing ring 190 preferably has a dimension of 0.01 mm to 0.02 mm, such as 0.012 mm. The small-sized sealing ring 190 can make room for the electric core and the electrolyte, thereby increasing the capacity of the rechargeable button cell 100 by about 3%-8%. In addition, both the sealing ring 190 and the anode shell 110 need to be separately coated with a sealant to enhance a sealing effect.

The anode tab 150 is at least partially provided between the anode shell wall 111 and the sealing portion 191. That is, the anode tab 150 extends outward from the bottom of the sealing ring 190 in the radial direction of the rechargeable button cell 100 and is bent upward to the radial outer side of the sealing ring 190. In this way, a welding process between the anode tab 150 and the anode shell 110 can also be eliminated, in addition to increasing the contact tightness between the contact surfaces of the anode tab 150 and the anode shell 110 to reduce the internal resistance.

In order to make the contact between the anode tab 150 and the anode shell 110 closer, the anode shell wall 111 is provided with a recess 113 that is recessed inward in the radial direction of the rechargeable button cell 100, and the anode tab 150 abuts against the recess 113. Preferably, the anode tab 150 extends beyond the recess 113. This solution can also limit the height of the rechargeable button cell 100 and prevent the cathode shell 120 from popping up after assembly.

Preferably, a binding wire may be provided at the recess 113. The binding wire is wound to the recess 113 from the outside of the rechargeable button cell 100 to fasten the anode shell 110.

Unless defined otherwise, all technical and scientific terms used herein have the same meaning as commonly understood by one of ordinary skill in the art to which the present invention belongs. The terminology used herein is for the purpose of describing particular embodiments only and is not intended to limit the present invention. Features described in one embodiment herein may be applied to another embodiment separately or in combination with other features, unless they are not applicable to another embodiment or otherwise stated.

The present invention has been explained by the above embodiments, but it should be understood that the above embodiments are merely for the purpose of illustration and explanation rather than limiting the present invention within the scope described thereby. It will be appreciated by those skilled in the art that the present invention is not limited to the above embodiments, various transformations and modifications can be further made in accordance with the teachings of the present invention. These transformations and modifications are within the scope of the present invention as claimed. The scope of the present invention is defined by the appended claims and their equivalents.

What is claimed is:

1. A rechargeable button cell, comprising:
    an anode shell which is provided with a top opening, wherein an insulation layer is provided on a bottom of the anode shell, and the anode shell comprises an anode shell bottom and an anode shell wall that extends upward from a circumferential edge of the anode shell bottom;
    a cathode shell which is provided with a bottom opening, wherein an electrically conductive bar that protrudes downward is provided on a top of the cathode shell, the anode shell and the cathode shell define a receiving cavity, the cathode shell comprises a cathode shell top and a cathode shell wall that extends downward from a circumferential edge of the cathode shell top, and the cathode shell wall is located inside the anode shell wall;
    a coiled electric core which is located in the receiving cavity, wherein a channel that extends in an axial direction of the rechargeable button cell is provided in a middle of the coiled electric core, a center portion of the insulation layer overlaps with a projection of the channel along the axial direction of the rechargeable button cell, and the electrically conductive bar is located in the channel, wherein an anode tab and a cathode tab of the coiled electric core are provided on a same side of the coiled electric core, and the cathode tab is located above the insulation layer and electrically connected to the electrically conductive bar to realize electrical connection between the cathode tab and the cathode shell such that the anode shell and the cathode tab are insulated from each other by the insulation layer, the anode tab of the coiled electric core is electrically connected to the anode shell, and the anode tab and the cathode tab are provided adjacently to the anode shell; and
    a sealing ring, which comprises a sealing portion located between the anode shell wall and the cathode shell wall, and a bending portion that is bent inward around a bottom end of the cathode shell wall;
    wherein the anode tab is at least partially provided between the anode shell wall and the sealing portion.

2. The rechargeable button cell according to claim 1, wherein the anode side wall is provided with a recess that is recessed inward in a radial direction of the rechargeable button cell, and the anode tab abuts against the recess.

3. The rechargeable button cell according to claim 2, further comprising a binding wire which is wound to the recess from outside of the rechargeable button cell.

4. The rechargeable button cell according to claim 1, wherein a bottom of the electrically conductive bar is in a truncated cone shape.

5. The rechargeable button cell according to claim 1, wherein the electrically conductive bar is welded to the cathode shell.

6. The rechargeable button cell according to claim 1, wherein the cathode tab is connected to the electrically conductive bar by welding.

7. The rechargeable button cell according to claim 1, wherein the center portion of the insulation layer overlapping with the projection of the channel along the axial direction of the rechargeable button cell does not have an opening thereon.

* * * * *